US005535087A

United States Patent [19]
Puckett et al.

[11] Patent Number: 5,535,087
[45] Date of Patent: Jul. 9, 1996

[54] CIRCUIT FOR REDUCING EFFECTS OF TRANSIENT EVENTS ON ELECTRONIC EQUIPMENT

[75] Inventors: James D. Puckett; Edward K. Weiss, both of Phoenix; Paul E. Russell, Scottsdale; J. Michael Pearson, Glendale, all of Ariz.

[73] Assignee: Power Quality Engineering, Inc., Phoenix, Ariz.

[21] Appl. No.: 181,854

[22] Filed: Jan. 14, 1994

[51] Int. Cl.$^6$ ............................................. H03J 3/22
[52] U.S. Cl. ............................... 361/118; 323/211; 333/175
[58] Field of Search ............................... 323/210, 211, 323/228; 361/111, 113, 58; 333/167, 175, 168

[56] References Cited

U.S. PATENT DOCUMENTS

| 5,168,251 | 12/1992 | Zennamo, Jr. et al. | |
| 5,388,021 | 2/1995 | Stahl | 361/111 |
| 5,399,955 | 3/1995 | Glaser et al. | 323/208 |

Primary Examiner—Jeffrey A. Gaffin
Assistant Examiner—Peguy JeanPierre
Attorney, Agent, or Firm—Joseph H. Roediger

[57] ABSTRACT

A circuit for reducing the effects of unpredictable changes in power supply and variations in loading on sensitive equipment, e.g. CT scanning system, to reduce inaccurate readings and protect equipment. The circuit utilizes a network of variable reactances controlled either by manual switches or by a microprocessor receiving inputs from a plurality of monitoring locations within the network.

15 Claims, 2 Drawing Sheets

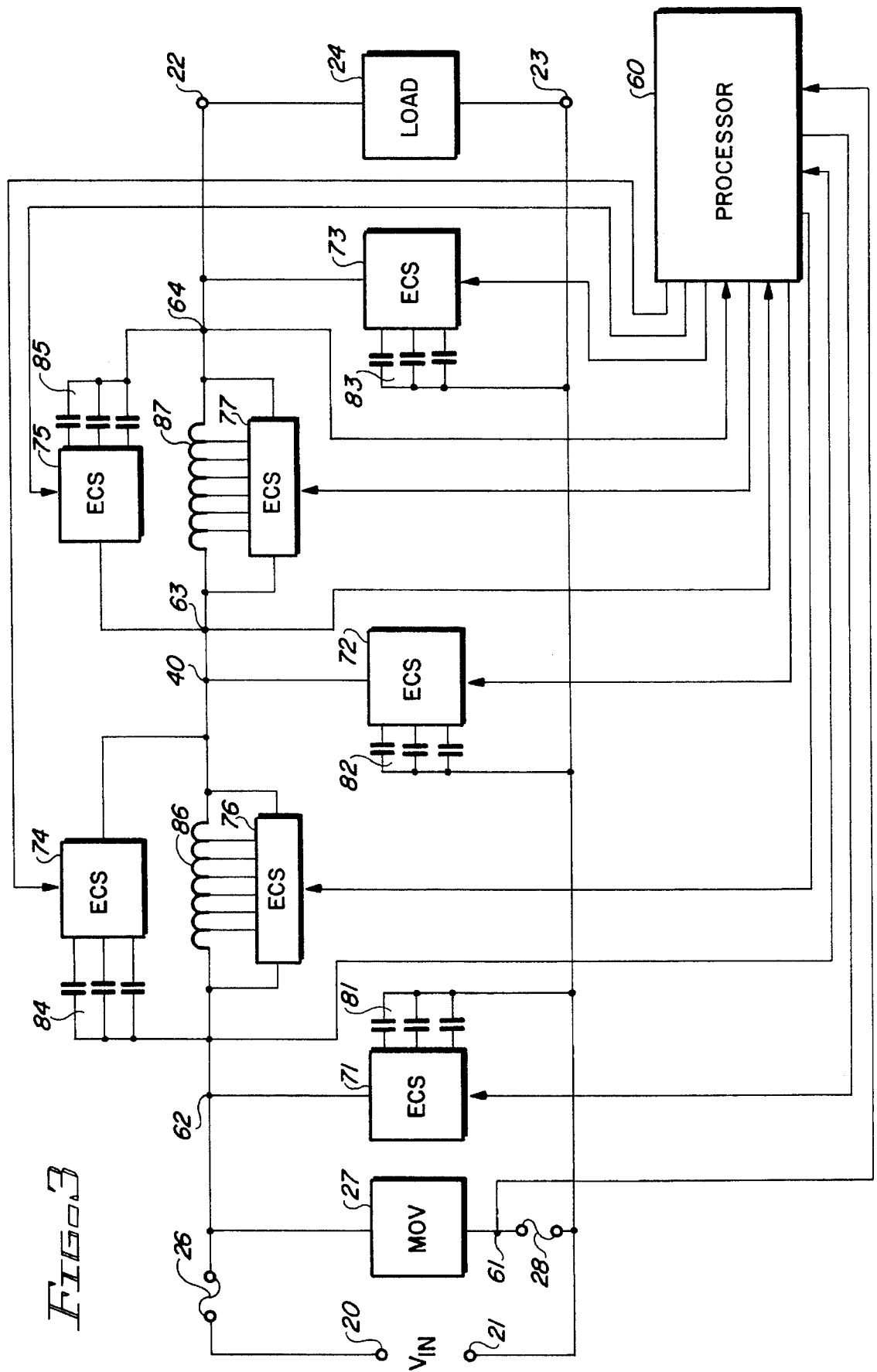

CIRCUIT FOR REDUCING EFFECTS OF TRANSIENT EVENTS ON ELECTRONIC EQUIPMENT

BACKGROUND OF THE INVENTION

This invention relates to an electrical circuit for protecting sensitive electrical equipment and maintaining accuracy of operation thereof while the equipment is exposed to variations in magnitude and waveform of the power delivered from an external source. More particularly, the present invention utilizes a plurality of variable reactances in a network interposed between the external power source and the equipment to maintain a sinusoidal waveform for the applied voltage and to essentially eliminate the effect of transient phenomena on the equipment.

Present day electronic equipment is designed for carrying out extremely sensitive measurement of externalities and performing complex functions with the gathered data. The capabilities and sensitivity of the equipment appears to be increasing exponentially, most notably in the medical field. The introduction of tomographic scanning equipment has been rapidly followed by its widespread distribution and the development of expanded capabilities therefor. For example, the number of magnetic resonance imaging machines routinely employed throughout the United States as diagnostic tools has quickly increased. The medical equipment field is but one example of the expanding use of sensitive electronic equipment to obtain and process data.

While increasing reliance is being placed on the data generated by these electronic systems, the accuracy of operation, mean time between failure and equipment lifetime are becoming increasingly determined by the quality of the power delivered to the equipment. In the past, protective circuitry has been utilized to prevent voltage spikes in the power delivery system from causing damage to equipment. Typically, a shunt conductive path with variable loading is coupled across the terminals of the local power delivery network to limit the magnitude of transient voltage disturbances delivered to the equipment. The shunt path serves as a clamping circuit to limit voltage spikes to a predetermined level. Thus, a measure of protection against immediate failure is obtained since the input voltage is prevented from rising above the predetermined level.

While the effect of severe transient occurrences is reduce& transient phenomena tend to cause a series of subsequent oscillations or ringing effects that can be passed on to the equipment unless filtered or suppressed. The use of low pass filters in combination with diode pairs to partially counter these effects is disclosed in U.S. Pat. Nos. 4,095,163 and 4,156,838 to H. R. Montague. One circuit utilizes a series combination of zener diodes connected in opposition for damping oscillations, while the second circuit uses a parallel pair of opposing diodes. Each circuit includes a fixed series inductor and a fixed shunt capacitor in an attempt to divert high frequency transients.

Transient phenomena are also known to promote the flow of current surges in the shunt branch of the above-noted prior art circuits. These surges can be damaging to the components of the protective circuits thereby rendering the protective circuit inoperative and exposing the equipment to damage from subsequent transients. One approach to improving the reliability of protective circuits has been to add a magnetic element to the shunt circuit which presents a high impedance to high frequency components of transients while maintaining a low impedance at the frequency of the power supply. A more detailed discussion of this type of circuit is found in U.S. Pat. No. 4,434,396 to H. R. Montague.

Prior approaches to suppressing the major effects of high voltage transients on the power supply bus have been directed to overvoltage protection to prevent damage to the equipment and to the partial filtering of high frequency noise pulses on the input bus to prevent application of substantial transient effects to the load. These circuits have not been concerned with maintaining a sinusoidal waveform for the power delivered to the load. As a result, the waveforms of the voltage and current appearing at the input terminals of sensitive electronic equipment are subject to a variety of distorting effects. Waveform distortion can give rise to operating errors in the form of incorrect data or processing errors.

The problem of operating error leading to false data readouts is compounded by the fact that the loads themselves vary significantly during operation. As a result, a protective circuit interposed between the external power supply and a sensitive electronic instrument is required to maintain a sinusoidal waveform while encountering transient occurrences presented from the circuit input or output terminals.

Accordingly, a primary objective of the present invention is the provision of a protective circuit for maintaining the sinusoidal waveform of voltage and current supplied to a load. In addition, the circuit is intended for use with varying loads thereby suppressing transient occurrences taking place at both input and output terminals of the circuit. The present invention is well-suited for use with sensitive medical diagnostic equipment which receives power from the local utility grid and is therefore subjected to transient occurrences and waveform distortion resulting from variable loading at other locations on the grid.

SUMMARY OF THE INVENTION

This present invention is directed to a circuit for reducing the effects of unpredicted changes in electrical operating conditions arising from disturbances in the magnitude and waveform of delivered power as well as changes caused by rapid changes in circuit loading on sensitive electronic equipment. The circuit is coupled between the external source of power and equipment relying on the delivery of ac power having an essentially pure sinusoidal waveform without the distortions caused by spikes, high frequency oscillations or undesired changes in r.m.s. values. The waveform of the voltage applied to equipment that is operated intermittently at various power levels is affected not only by conditions on the supply lines but also by the operating level of the equipment. This circuit operates to essentially eliminate these effects from distorting the power supplied to the equipment.

The circuit comprises a pair of input terminals for coupling to an external power source, typically the single phase to neutral connections to the grid of the electric utility serving the area. A pair of output terminals are provided for coupling to the equipment, e.g. a computerized tomography (CT) diagnostic imaging machine.

A plurality of inductive elements are serially connected between one of the input terminals and one of the output terminals with an internal terminal being provided at the interconnection of serial inductive elements. At least one of the inductive elements is variable with means provided for individually varying the impedance thereof. Also, a plurality of first capacitive elements are employed in the circuit with each of the first capacitive elements being connected in parallel with a corresponding one of the inductive elements. At least one of the first capacitive elements is variable with means being provided for individually varying the impedance thereof.

The circuit also includes a plurality of filter capacitive elements with one filter capacitor being connected between the output terminal and another of said plurality being connected between the internal terminal and an output terminal. Means are provided for individually varying the impedance of the filter capacitive elements.

The control means for individually varying the impedance of the inductive and capacitive elements may be discrete switches manually operated after analysis of the interactive effects of variations in voltage from the external power supply for different operating levels of the equipment coupled to the output terminals. In the preferred embodiments, the voltage waveforms at various points in the circuit are sampled and supplied to a micro processor which electronically controls the magnitude of the individual impedances accordingly.

Further features and advantages of the invention will become more readily apparent from the following detailed description of specific embodiments of the invention when viewed in conjunction with the accompanying drawings.

BRIEF DESCRIPTION OF THE DRAWINGS

FIG. 3 is a block schematic diagram of a second embodiment of the invention.

DESCRIPTION OF THE PREFERRED EMBODIMENTS

Figure 1:
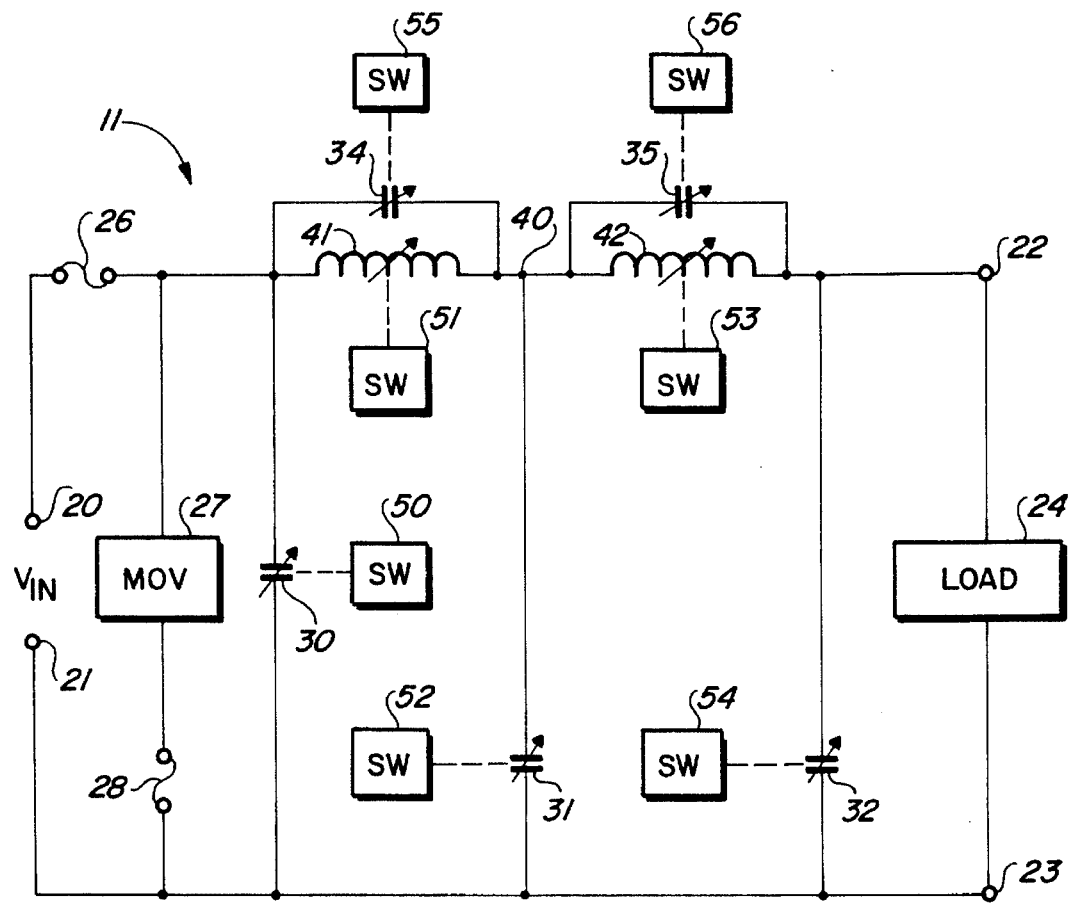
FIG. 1 is a block schematic diagram of one embodiment of the invention.

Referring now to FIG. 1, a block schematic diagram of one embodiment of the invention is shown with its output terminals 22 and 23 coupled to a load 24. The load is typically a sensitive electronic diagnostic machine such as a magnetic resonance imaging (MRI) system. While the following description refers the use of the subject invention with sensitive medical equipment, it is to be noted that other types of highly sensitive electronic equipment will benefit from the placement of the invention between tire equipment and an external power source. This type of equipment can be found in process controlled manufacturing, telecommunications, computer networking, data processing and robotics control as well as in the medical radiologic and diagnostic field. The equipment associated with these applications employs sensitive electronic circuitry that relies on a source of predictable power having little or no variation in magnitude and waveform in order to operate reliably and consistently to its rated effectiveness. Present day electrical distribution systems are acted upon by a growing number of extraneous factors that are capable of introducing an unreliability factor to the characteristics of delivered power. The use of fixed filter technologies and transient suppressors provide some protection against catastrophic events, but they do not address the problem of changing conditions of less than equipment damaging significance. The inability of a general purpose fixed filter to adapt to the operating environment can effect the reliability of the data generated by the sensitive equipment without the actual knowledge of the operator.

The present invention is concerned with a circuit for reducing the effects of unpredicted changes and other transient phenomena in electrical operating conditions on sensitive equipment by the provision of a multiplicity of individually controlled reactances interposed between the input terminals 20, 21 coupled to the external power source and the output terminals 22, 23 coupled to the load 24. At the input end of embodiment of FIG. 1, fuse 26 is provided as the first level of overload protection. In the parallel arm containing metal oxide varistor MOV 27 a secondary fuse 28 is provided. The MOV 27 provides transient protection to prevent exceedingly large spikes from destroying the individual components of the present circuit and reaching the load 24. The MOV is sized to a particular system, for example a 480 volt system may use MOV 27 to establish a 700 volt peak level or a 120 volt system might establish the clamping level at 210 volt peak. Thus, significant voltage transients are still available to affect the load 24.

A first variable filter capacitor 30 is coupled between terminals 20 and 21. Switch means 50 for varying the magnitude of the capacitor 30 is coupled thereto. Next, a plurality of inductive elements 41 and 42 are serially connected between input terminal 20 and output terminal 22. An internal terminal 40 is provided between the adjacent inductive elements. Each of these inductive elements is variable and controlled by corresponding switch means 51 and 53. Each of the variable inductors is provided with a capacitive element connected in parallel. As shown in FIG. 1, capacitive element 34 is coupled across inductor 41 and capacitive element 35 is coupled across inductor 42. The capacitive elements are each provided with control means for individually varying the impedances thereof in the form of manually-operated controls 55 and 56 respectively.

A second filter capacitor 31 is connected between internal terminal 40 and the bus between input terminal 21 and output terminal 23. A third filter capacitive element 32 is connected between output terminals 22 and 23. Each of the three filter capacitive elements 30, 31 and 32 is variable and controlled by the corresponding third control means shown as elements Sw 50, 52 and 54 respectively. Thus, in the embodiment of FIG. 1, each of the reactances is individually variable and controlled by a corresponding switch means. This embodiment utilizes rotary switches which are manually adjustable by the operator at the time of installation. The adjustment takes place after extensive analysis of the characteristic of the variations including different forms of transients appearing as $V_{in}$ between terminals 20 and 21 followed by an analysis of the effects of different magnitudes or operating levels of the load 24. The interaction of the different variable reactances effectively compensates for transient occurrences which distort the waveform of the power flowing from the external grid. Representative variations are shown in the waveform diagrams of FIG. 2.

Figure 2:
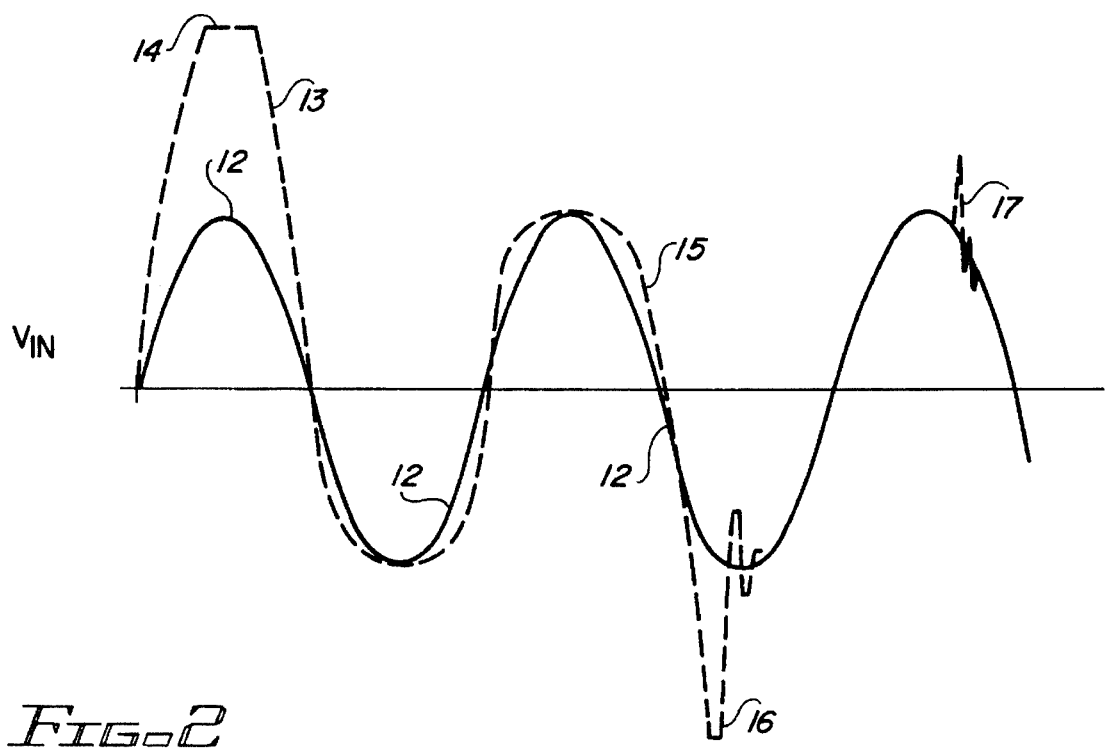
FIG. 2 is a diagram of a supply voltage waveform with representative transient occurrences shown thereon.

Referring now to FIG. 2, the idealized waveform 12 shown in solid line corresponds to the desired voltage waveform appearing between terminals 20 and 21. In normal operation, the idealized waveform is a goal of the power supply grid that is continually departed from over time. Several types of departures are shown in FIG. 2 with the first being a major increase in voltage which exceeds the designed rating of MOV 27 in FIG. 1. The dashed waveform 13 is shown clipped at its peak 14 by the action of the varistor 27. While the varistor provides the protection needed to prevent catastrophic events at the load 24, the departure of the clipped waveform from the idealized or pure sinusoidal waveform 12 is apparent. A second type of transient occurrence is shown during the following cycle when the waveform is broadened to increase the r.m.s. value. The broadened waveform 15 shown in dashed form in FIG. 2 can result in substantially increased power being delivered to load 24 without the presence of a significant voltage spike. An additional occurrence is shown by the dashed outline 16 which comprises a clipped negative-going spike followed by subsequent oscillations. A like transient phenomenon is shown by dashed waveform 17 wherein the transient occurrence does not exceed the level of the protective varistor MOV 27 and would otherwise pass intact and be presented to load 24. These representations of transient events occurring on the network or grid of the power source are representative of the types of disturbances that are substantially eliminated by the present invention.

It should be noted that transient events can result and frequently do from changes in the operating characteristics of the load 24. These events are especially prevalent in medical systems wherein the equipment draws large currents for short intervals and may cycle repeatedly. Thus, the transient phenomena occur not only because of disturbances occurring at the input terminals but also are created by the effect of variable loading at the output terminals 22 and 23. The high frequency components of these transient occurrences are shunted by the filter capacitive elements 30, 31 and 32. In addition, the circulating currents in the various inductive-capacitive loops provide compensation for changing load current disturbing the purity of the input waveform because of the internal impedance of circuitry external to terminals 20 and 21 and the high current short operating interval of the load. The present invention serves to purify the waveform and reduce the effect of variations in the load 24. As a result, the likelihood of transient phenomena being created by changing conditions at the input or the output terminals is essentially eliminated. Increased confidence in the accuracy of operation of sensitive electronic equipment coupled to output terminals 23 is obtained. Furthermore, reduced deterioration of the electronic components is a result of the use of the present invention.

An alternate embodiment is shown in FIG. 3 wherein the manually operated control means shown as elements Sw 50, 51, 52, 53, 54, 55 and 56 in FIG. 1 are replaced by electronically controlled switches coupled to a processor 60. As shown, the processor 60 receives input from four monitoring points 61, 62, 63 and 64 in the protective circuit. The processor is programmed to determine voltage levels at the various monitoring points and vary the magnitude of the reactances throughout the circuit based on the time rate of change of the voltage at each monitoring point and the magnitude at a given time. The processor outputs shown in FIG. 3 as seven in number are each coupled to an electronically controlled switch (ECS) connected to a reactance element.

the embodiment of FIG. 3, common elements with the embodiment of FIG. 1 are denoted by the same numerals. The variable filter capacitive elements 81, 82 and 83 are each shown as comprised of three parallel individual capacitors. The corresponding ECS 71, 72 and 73 switch the individual capacitors in and out of the circuit under the control of processor 60. Similarly, the first capacitive elements 84 and 85 are controlled by the corresponding ECS 74 and 75. While each of the first capacitive elements is shown containing three individual capacitors, the number and size of the individual capacitors can be varied based on the incremental steps in the impedance characteristic of the variable capacitive elements. Again, the first capacitive elements are controlled through their corresponding ECS by processor 60.

The inductive elements 86 and 87 are controlled by corresponding ECS 76 and 77 which are connected to processor 60. The internal terminal 40 is located between the serially connected inductive elements. Thus, all seven reactances can be varied accordance with the output signals from processor 60. The processor 60 receives as its input the voltage conditions at monitoring points 61, 62, 63 and 64. The processor 60 contains all electronically programmable read only memory (EPROM) which is programmed after observation of the characteristics of the supply voltage $V_{in}$ have been observed with constant loads at output terminals 22 and 23. Next, the procedure requires that the load 24 be varied in accordance with its normal operating conditions to determine its effect on the harmonic content and resultant waveform of the voltage appearing at the different monitoring points. The objective of the present invention is to continually deliver an essentially pure sinusoidal waveform to load 24. Distortions due to spikes, ringing, high frequency oscillations and r.m.s. distortions regardless of origin can be eliminated by the appropriate variation of the individual reactances in the circuit of FIG. 3.

In operation, the EPROM having been programmed will receive as input signals the changes in magnitude of the voltages at the monitoring points. By sampling at a relatively high rate compared to the sixty Hz frequency of the external supply, time rate of change information is also available to the processor to restore the sinusoidal waveform. Changes in the r.m.s. voltage can occur through waveform broadening or contraction without significant change in the magnitude of the waveform. As a result, the present invention provides for the delivery of the anticipated voltage level with a relatively pure sinusoidal waveform. The load is then able to operate and achieve rated performance without having its operation distorted or contaminated by unpredictable variations in external power supplies and load variation.

While the foregoing description has referred to specific embodiments of the invention, it is to be noted that variations and modifications may be made therein without departing from the scope of the invention as claimed.

We claim:

1. A circuit for reducing the effects of transient changes generated by a load and external power source on the waveforms of voltage and current provided at the load, said circuit comprising:

a) a pair of input terminals for coupling to an external power source;

b) a pair of output terminals for coupling to the load, one of said output terminals being coupled to one of said input terminals;

c) a plurality of inductive elements connected in series between one of said input terminals and one of said output terminals, said inductive elements being interconnected at an internal terminal;

d) first control means for individually varying the impedance of at least one of said inductive elements;

e) a plurality of first capacitive elements, each of said first elements being connected in parallel with one of the inductive elements;

f) second control means for individually varying the impedance of the first capacitive elements;

g) a plurality of filter capacitive elements, one of said filter capacitors being connected between said output terminals, another of said plurality being connected between the internal terminal and an output terminal; and h) third control means for individually varying the impedance of the filter capacitive elements, said first, second and third control means varying the corresponding elements to reduce the effects of transient changes caused by the load and the external power source on the load.

2. The invention in accordance with claim 1 wherein said first, second and third control means are manually adjustable.

3. The invention in accordance with claim 2 wherein each of said plurality of inductive elements is independently variable.

4. The invention in accordance with claim 3 wherein each of said plurality of first capacitive elements is independently variable.

5. The invention in accordance with claim 4 wherein each of said filter capacitive elements is independently variable.

6. The invention in accordance with claim 5 further comprising a varistor coupled between said input terminals.

7. A circuit for reducing the effects of unpredicted changes in circuit loading and external power on the voltage and current waveforms of power provided at a load, said circuit being coupled between an external power supply and a load, said circuit comprising:

a) first and second inductive elements serially connected between power supply and load to form an internal connection therebetween, at least one of said inductive elements having a variable impedance;

b) first and second capacitive elements each connected in parallel with one of said inductive elements, at least one of said capacitive elements having a variable impedance;

c) a first variable filter capacitor connected in parallel across the load;

d) a second variable filter capacitor connected to said internal connection and across the load, and e) control means coupled to the variable elements for independently varying the impedances thereof, the independent variation of impedances essentially eliminating distortion of the voltage and current waveforms of the power provided to the load.

8. The invention in accordance with claim 7 wherein said control means is connected to the internal connection between said inductive elements for monitoring the voltage and varying the impedance of said elements.

9. The invention in accordance with claim 8 wherein said control means is connected to a plurality of monitoring points in the circuit.

10. The invention in accordance with claim 9 wherein each of said plurality of inductive elements is independently variable.

11. The invention in accordance with claim 10 wherein each of said capacitive elements is independently variable.

12. The invention in accordance with claim 11 wherein each of said filter is independently variable.

13. The invention in accordance with claim 12 wherein said capacitive elements and said filter capacitors each comprise a plurality of capacitors connected in parallel.

14. The invention in accordance with claim 13 wherein said control means includes an electronically controlled switch coupled to each inductive element capacitive element and filter capacitor, and a processor circuit for controlling the operation of each switch.

15. The invention in accordance with claim 14 wherein said processor is coupled to a plurality of monitoring points in the circuit.

* * * * *